US012777278B2

(12) United States Patent
Silver

(10) Patent No.: US 12,777,278 B2
(45) Date of Patent: Oct. 27, 2026

(54) SPEAKER WITH SINGLE DRIVER FORCE CANCELLATION

(71) Applicant: Meta Platforms Technologies, LLC, Menlo Park, CA (US)

(72) Inventor: Jason Silver, Sunnyvale, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 351 days.

(21) Appl. No.: 18/405,295

(22) Filed: Jan. 5, 2024

(65) Prior Publication Data

US 2024/0236556 A1 Jul. 11, 2024

Related U.S. Application Data

(60) Provisional application No. 63/478,628, filed on Jan. 5, 2023.

(51) Int. Cl.
*H04R 1/28* (2006.01)
*H04R 1/02* (2006.01)
(Continued)

(52) U.S. Cl.
CPC ........... *H04R 1/2896* (2013.01); *H04R 1/025* (2013.01); *H04R 1/028* (2013.01); *H04R 1/2834* (2013.01);
(Continued)

(58) Field of Classification Search
CPC . H04R 1/02; H04R 1/24; H04R 9/043; H04R 9/045; H04R 2499/15; H04R 1/2834
(Continued)

(56) References Cited

U.S. PATENT DOCUMENTS 6,466,682 B2 10/2002 An
6,839,443 B2 1/2005 Fukuda
(Continued)

FOREIGN PATENT DOCUMENTS

EP 2429217 A1 3/2012
EP 3734988 A1 11/2020
(Continued)

OTHER PUBLICATIONS

Analog Devices, "High Performance, Low Noise Studio Microphone with MEMS Microphones, Analog Beamforming, and Power Management," Application Note AN-1328, 2014, 9 pages, Retrieved from the Internet: URL: https://www.analog.com/media/en/technical-documentation/application-notes/an-1328.pdf.
(Continued)

*Primary Examiner* — Sean H Nguyen
(74) *Attorney, Agent, or Firm* — Greenberg Traurig, LLP

(57) ABSTRACT

A speaker system includes a fixed frame, a voice coil and a first moving mass that includes a diaphragm. The first moving mass is coupled to the fixed frame via a non-rigid primary suspension and coupled to the voice coil. The speaker system further includes a second moving mass that includes a motor assembly and is coupled to the fixed frame via a non-rigid secondary suspension. The diaphragm is configured to move in response to an audio drive signal, applied via the motor assembly, which asserts a force on the voice coil. A first force, on the motor assembly caused by applying the audio drive signal and pushing the voice coil, is canceled by a second force on the moving motor assembly from the non-rigid secondary suspension.

20 Claims, 14 Drawing Sheets

(51) Int. Cl.
*H04R 7/18* (2006.01)
*H04R 9/04* (2006.01)
*H04R 9/06* (2006.01)

(52) U.S. Cl.
CPC ............... *H04R 7/18* (2013.01); *H04R 9/045* (2013.01); *H04R 9/06* (2013.01); *H04R 2400/11* (2013.01); *H04R 2499/15* (2013.01)

(58) Field of Classification Search
USPC .......................................................... 381/386
See application file for complete search history.

(56) References Cited

U.S. PATENT DOCUMENTS

| | | | |
|---|---|---|---|
| 9,094,747 B2 | 7/2015 | Rayner | |
| 9,241,206 B2 | 1/2016 | Nevill | |
| 9,294,841 B2 | 3/2016 | Sahyoun | |
| 9,743,205 B2 | 8/2017 | Stetson | |
| 9,820,035 B2 | 11/2017 | Dominijanni et al. | |
| 9,980,069 B2 | 5/2018 | Hartwell | |
| 10,244,312 B2 | 3/2019 | Rousseau et al. | |
| 10,327,083 B2 | 6/2019 | Rusconi Clerici Beltrami et al. | |
| 10,351,419 B2 | 7/2019 | Gao et al. | |
| 10,631,096 B1 | 4/2020 | Garcia Selva et al. | |
| 10,812,900 B2 | 10/2020 | Khenkin et al. | |
| 11,450,113 B1 | 9/2022 | Vaziri | |
| 11,570,547 B2 | 1/2023 | Silver | |
| 2011/0274308 A1 | 11/2011 | Doh et al. | |
| 2014/0266260 A1 | 9/2014 | Wurzinger et al. | |
| 2016/0249136 A1 | 8/2016 | Kim | |
| 2017/0272866 A1 | 9/2017 | Griffiths | |
| 2018/0270568 A1* | 9/2018 | Litovsky | H04R 1/2834 |
| 2022/0400338 A1 | 12/2022 | Silver | |
| 2024/0031712 A1 | 1/2024 | Corynen | |
| 2024/0284096 A1 | 8/2024 | Silver | |
| 2024/0292136 A1 | 8/2024 | Silver et al. | |
| 2025/0039612 A1 | 1/2025 | Zhou | |
| 2025/0071471 A1 | 2/2025 | Zhang et al. | |

FOREIGN PATENT DOCUMENTS

| | | |
|---|---|---|
| WO | 2010076656 A2 | 7/2010 |
| WO | 2022048810 A1 | 3/2022 |

OTHER PUBLICATIONS

Johnson R.C., "MEMS Mics Taking Over," EE Times, Dec. 2, 2014, 2 pages, Retrieved from the Internet: URL: https://www.eetimes.com/mems-mics-taking-over/.

Martin D.T., "Design, Fabrication, and Characterization of a MEMS Dual-Backplate Capacitive Microphone," University of Florida, 2007, 250 pages, Retrieved from the Internet: URL: http://ufdcimages.uflib.ufl.edu/UF/E0/01/75/26/00001/martin_d.pdf.

ST Application Note, "Tutorial for MEMS Microphones," Mechanical Specifications, Construction details, Feb. 2017, 20 pages, Retrieved from the Internet: URL: https://www.st.com/resource/en/application_note/dm00103199-tutorial-for-mems-microphones-stmicroelectronics.pdf.

International Preliminary Report on Patentability for International Application No. PCT/US2024/016667, mailed Sep. 4, 2025, 7 pages.

International Search Report and Written Opinion for International Application No. PCT/US2024/016667, mailed May 21, 2024, 10 pages.

* cited by examiner

SPEAKER WITH SINGLE DRIVER FORCE CANCELLATION

CROSS-REFERENCE TO RELATED APPLICATIONS

This application claims priority to U.S. Provisional Patent Application No. 63/478,628, filed on Jan. 5, 2023 and titled "SINGLE DRIVER FORCE CANCELING WITH SPRING BETWEEN MOTOR AND BASKET," which is herein incorporated by reference in its entirety.

TECHNICAL FIELD

The present disclosure is directed to a speaker/loudspeaker, or a device that produces sound.

BACKGROUND

When a speaker is mounted on a wearable device, such as an artificial reality (XR) device (e.g., virtual reality (VR) headset, mixed reality (MR) headset, or augmented reality (AR) glasses), it may generate vibration to the whole device, causing unwanted shaking and contamination to signals. For example, an inertial measurement unit (IMU) may be included in an XR device for tracking of body and head motion of the wearer during XR use, and contamination of IMU signals can result in inaccurate measurements that are difficult to correct. Audio leakage from a wearable device may also be undesirable, as a wearer may wish to maintain privacy. However, known speakers, particularly those that are manufactured for better bass performance, generally have increased shaking and increased leakage that is unsuitable for many wearable device applications.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
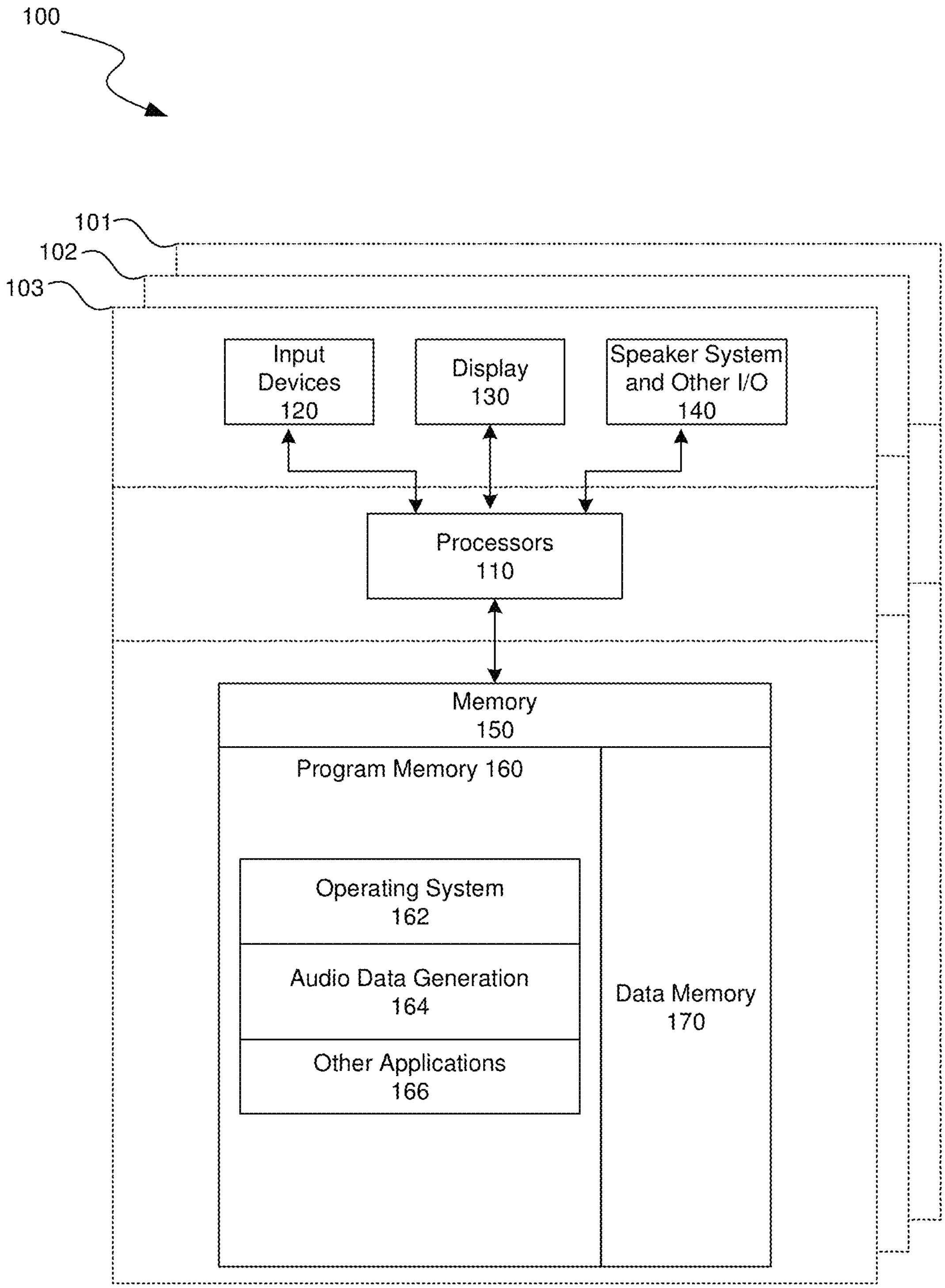
FIG. 1 is a block diagram illustrating an overview of devices on which some implementations of the present technology can operate.

Aspects of the present disclosure are directed to a speaker system that uses a single driver that results in both force and moment canceling. The speaker system can be mounted within a structure, such as a head mounted display. The first moving mass can include a diaphragm, a voice coil, and a diaphragm surround. A primary suspension (i.e., the diaphragm surround) can be attached to a fixed flange or fixed basket/frame to couple the first moving mass to the structure. The second moving mass or driver, can include a magnet core/motor assembly. A secondary suspension (e.g., a decoupling flat spring) can be coupled between the frame and the second moving mass. The secondary suspension can reduce shaking and contamination, from the magnet core/motor assembly, from seeping into the frame and subsequently to other components of a head mounted display.

The speaker system can be configured so that the natural frequency and resonance quality "Q" of the first moving mass and primary suspension is substantially the same as the natural frequency and resonance quality "Q" of the second moving mass and secondary suspension. In some implementations, the speaker system can also include air cavities above and below the motor assembly which are sized and configured to result in both force and moment canceling. As a result, the contamination signals caused by the speaker that would otherwise be transmitted to the basket and to the structure are further substantially mitigated.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that generates audio by driving a speaker. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on.

Speaker system and other I/O devices 140 can also be coupled to the processor, which can include one or more speakers with a diaphragm and motor assembly connected by a suspension to a fixed structure (i.e., fixed basket/frame), reducing vibration from the motor assembly and diaphragm into the fixed structure. In some implementations, these one or more speakers can also include air cavities above and below the motor assembly which are sized and configured to result in both force and moment canceling, further reducing vibration from the motor assembly into the fixed structure.

Speaker system and other I/O devices 140 can further include other I/O devices such as a network chip or card, video chip or card, audio chip or card, USB, firewire or other external device, camera, printer, CD-ROM drive, DVD drive, disk drive, etc. In some implementations, input from the I/O devices 140, such as cameras, depth sensors, IMU sensor, GPS units, LiDAR or other time-of-flights sensors, etc. can be used by the computing system 100 to identify and map the physical environment of the user while tracking the user's location within that environment. This simultaneous localization and mapping (SLAM) system can generate maps (e.g., topologies, girds, etc.) for an area (which may be a room, building, outdoor space, etc.) and/or obtain maps previously generated by computing system 100 or another computing system that had mapped the area. The SLAM system can track the user within the area based on factors such as GPS data, matching identified objects and structures to mapped objects and structures, monitoring acceleration and other position changes, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, audio data generation 164, and other application programs 166. Memory 150 can also include data memory 170 that can include, e.g., a mapping of audio data to speaker driver properties, configuration data, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
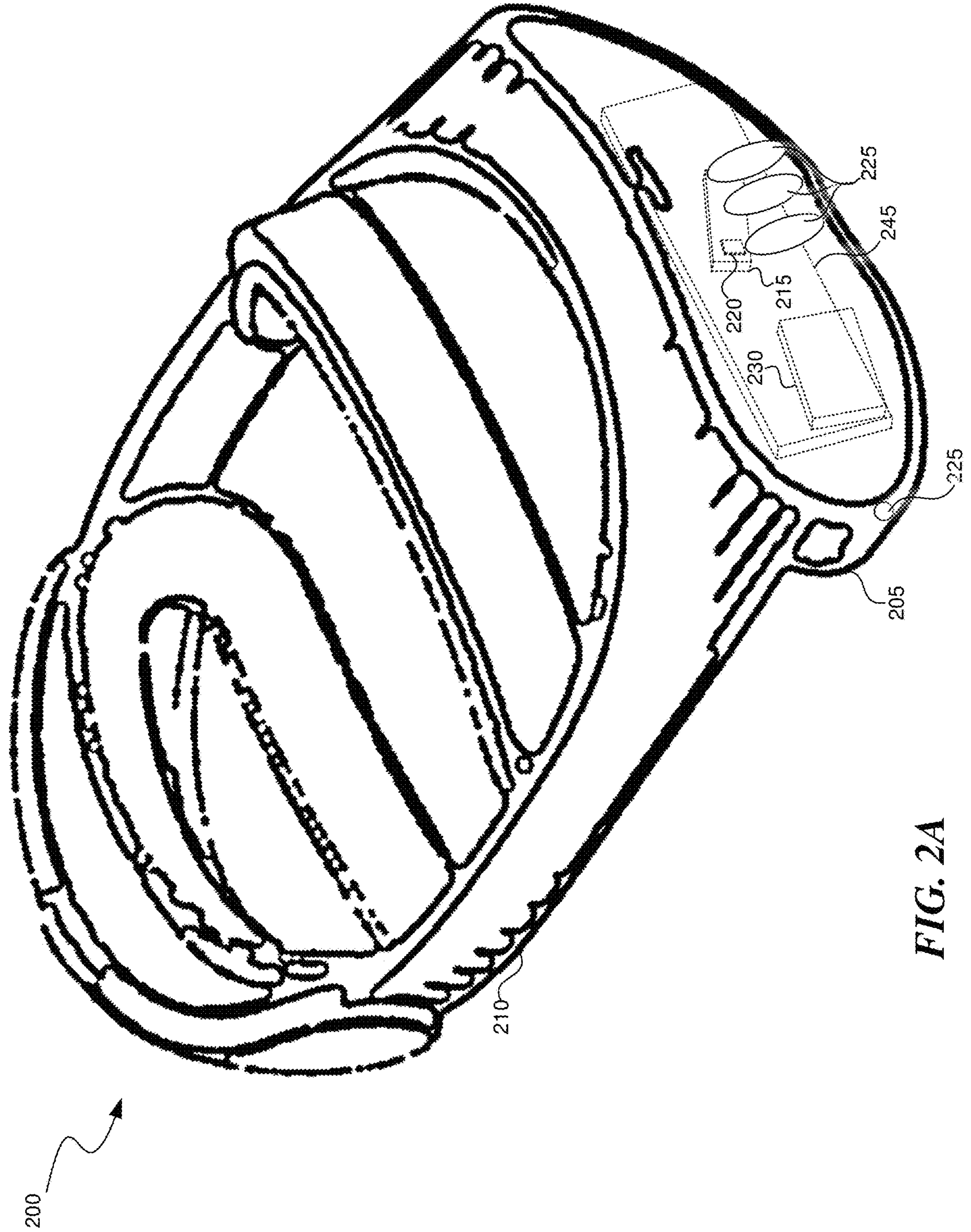
FIG. 2A is a wire diagram illustrating a virtual reality headset which can be used in some implementations of the present technology.

FIG. 2A is a wire diagram of a virtual reality head-mounted display (HMD) 200, in accordance with some embodiments. In this example, HMD 200 also includes augmented reality features, using passthrough cameras 225 to render portions of the real world, which can have computer generated overlays. The HMD 200 includes a front rigid body 205 and a band 210. The front rigid body 205 includes one or more electronic display elements of one or more electronic displays 245, an inertial motion unit (IMU) 215, one or more position sensors 220, cameras and locators 225, and one or more compute units 230. The position sensors 220, the IMU 215, and compute units 230 may be internal to the HMD 200 and may not be visible to the user. In various implementations, the IMU 215, position sensors 220, and cameras and locators 225 can track movement and location of the HMD 200 in the real world and in an artificial reality environment in three degrees of freedom (3DoF) or six degrees of freedom (6DoF). For example, locators 225 can emit infrared light beams which create light points on real objects around the HMD 200 and/or cameras 225 capture images of the real world and localize the HMD 200 within that real world environment. As another example, the IMU 215 can include e.g., one or more accelerometers, gyroscopes, magnetometers, other non-camera-based position, force, or orientation sensors, or combinations thereof, which can be used in the localization process. One or more cameras 225 integrated with the HMD 200 can detect the light points. Compute units 230 in the HMD 200 can use the detected light points and/or location points to extrapolate position and movement of the HMD 200 as well as to identify the shape and position of the real objects surrounding the HMD 200.

The electronic display(s) 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
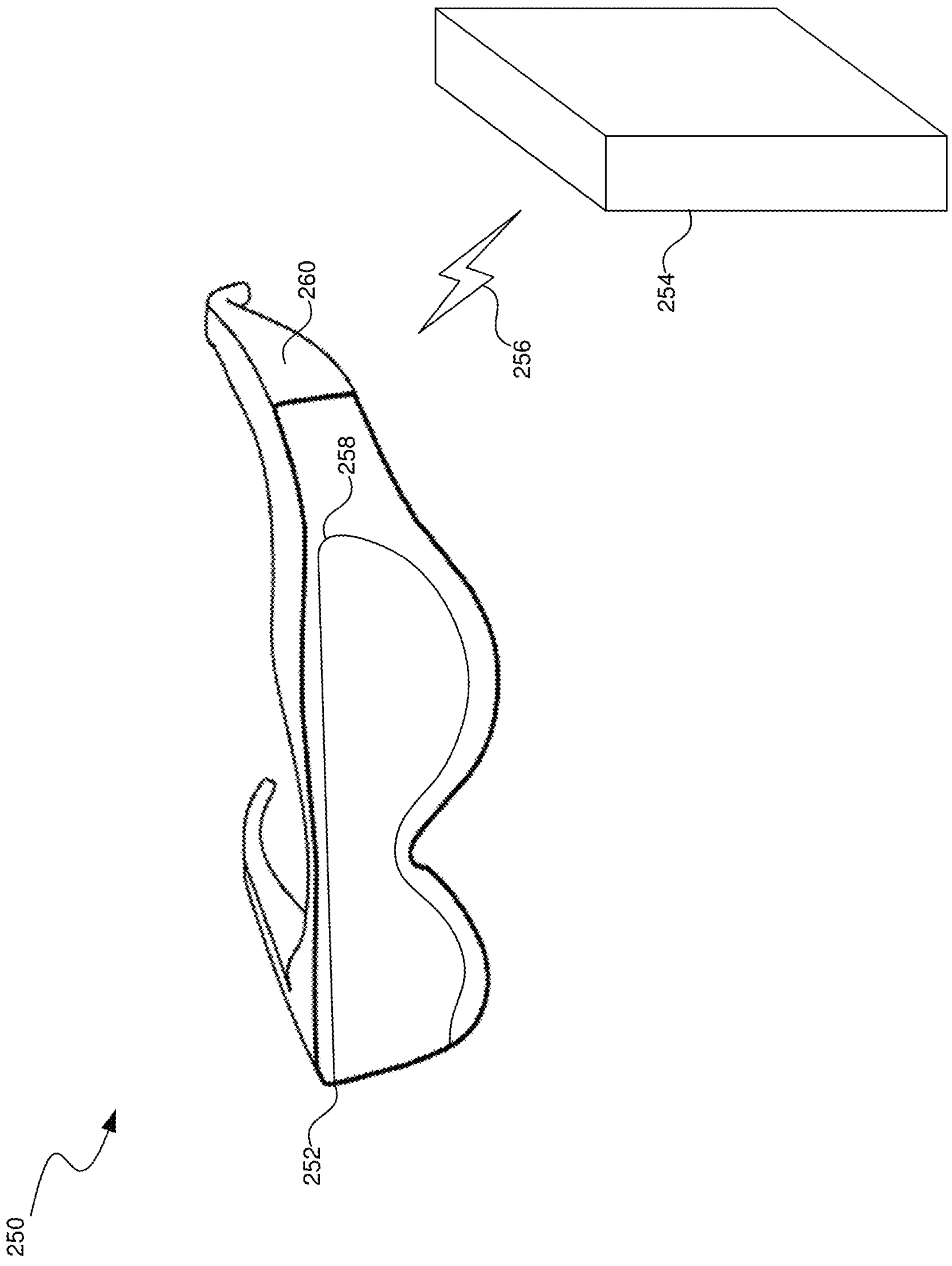
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

Figure 2C:
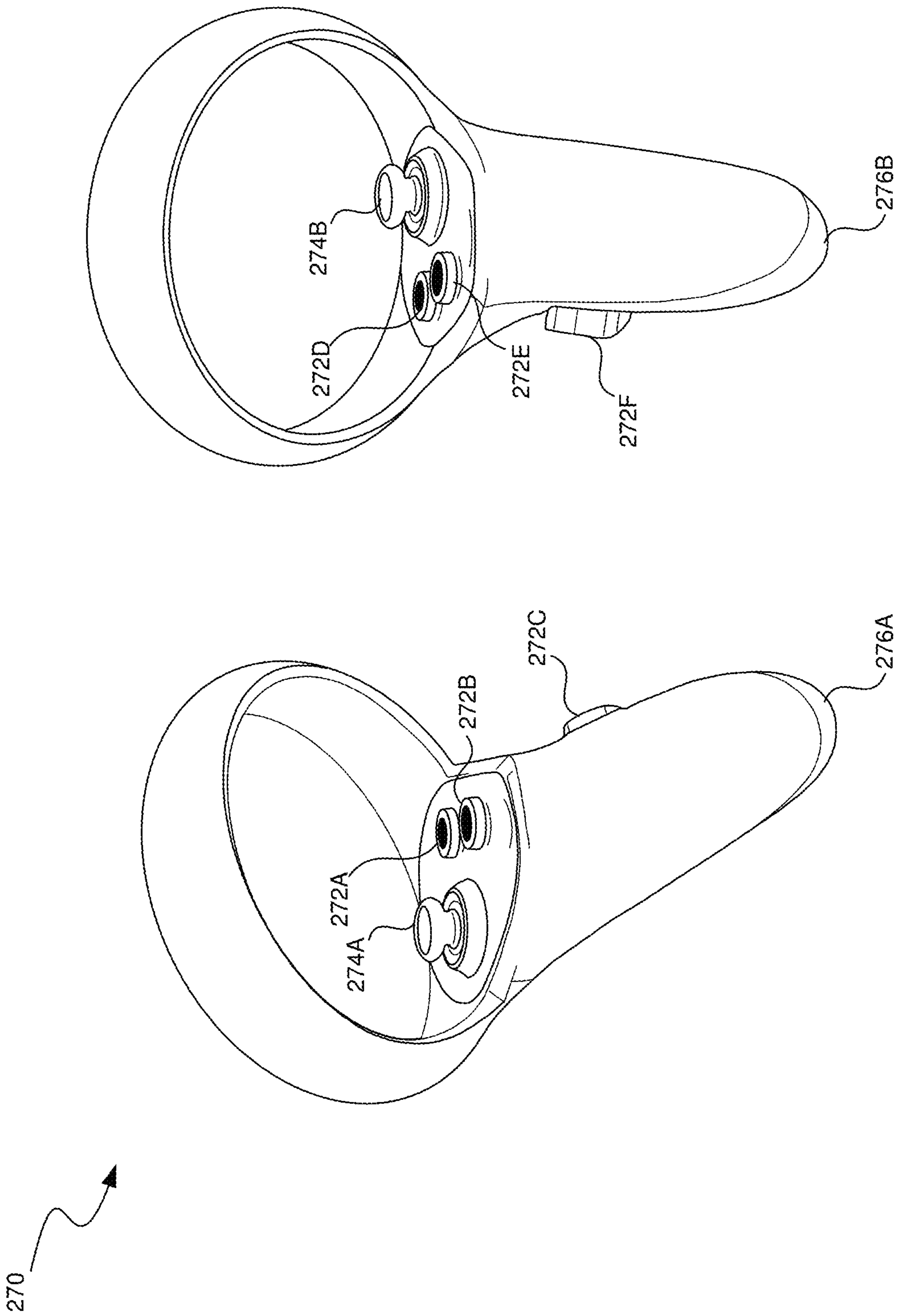
FIG. 2C is a wire diagram illustrating controllers which, in some implementations, a user can hold in one or both hands to interact with an artificial reality environment.

FIG. 2C illustrates controllers 270 (including controller 276A and 276B), which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3DoF or 6DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc., to monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions. As another example, one or more light sources can illuminate either or both of the user's eyes and the HMD 200 or 250 can use eye-facing cameras to capture a reflection of this light to determine eye position (e.g., based on set of reflections around the user's cornea), modeling the user's eye and determining a gaze direction.

Figure 3:
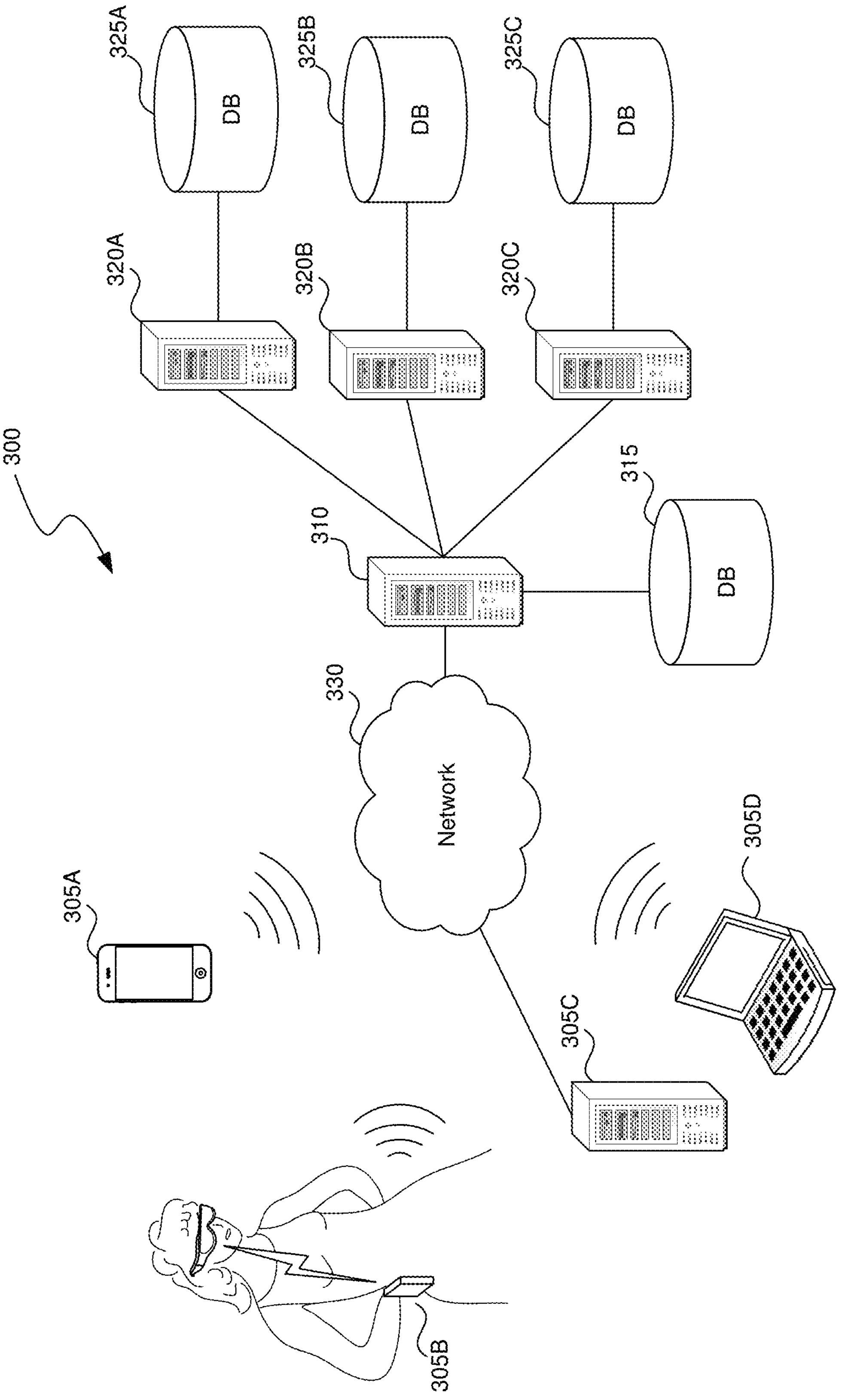
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

As described above, a speaker generates sound through the vibration of the diaphragm. When the speaker is mounted on a wearable device, such as an XR device, or wrist-worn devices such as a smart watch, it may generate vibrations of the wearable device that are detected by an inertial measurement unit (IMU) of the wearable device, interfere with a sensitive component such as a MEMS mirror, cause unwanted noise interference, etc. When these vibrations are detected by an IMU, for example, they can be "contamination signals", which can reduce motion tracking accuracy. These contamination signals may be difficult to eliminate by purely algorithmic processing due to a nonlinear, time varying, non-quantified gyroscope response to audio-band vibrations. A known mitigation approach is using a speaker system with a dual driver module, which includes two drivers moving in opposite directions to cancel the forces (i.e., vibrations) caused by the speaker. However, this approach requires two independent moving voice coils and diaphragms that must be matched. Drawbacks of this known approach include the increased cost for having two drivers, decreased packaging efficiency due to having to house both drivers, and increased weight.

In contrast to known approaches, implementations disclosed herein utilize a single driver and a non-rigid suspension/spring that couples the second moving mass to the fixed frame, and functions as a decoupling spring. The movement of the second moving mass in response to the single driver signal absorbs the magnetic force on the motor (instead of transmitting to the fixed basket), and the second suspension force cancels out the primary suspension force transmitted to the fixed basket by the first moving mass (i.e., diaphragm and voice coil) in response to the single driver.

Figure 4:
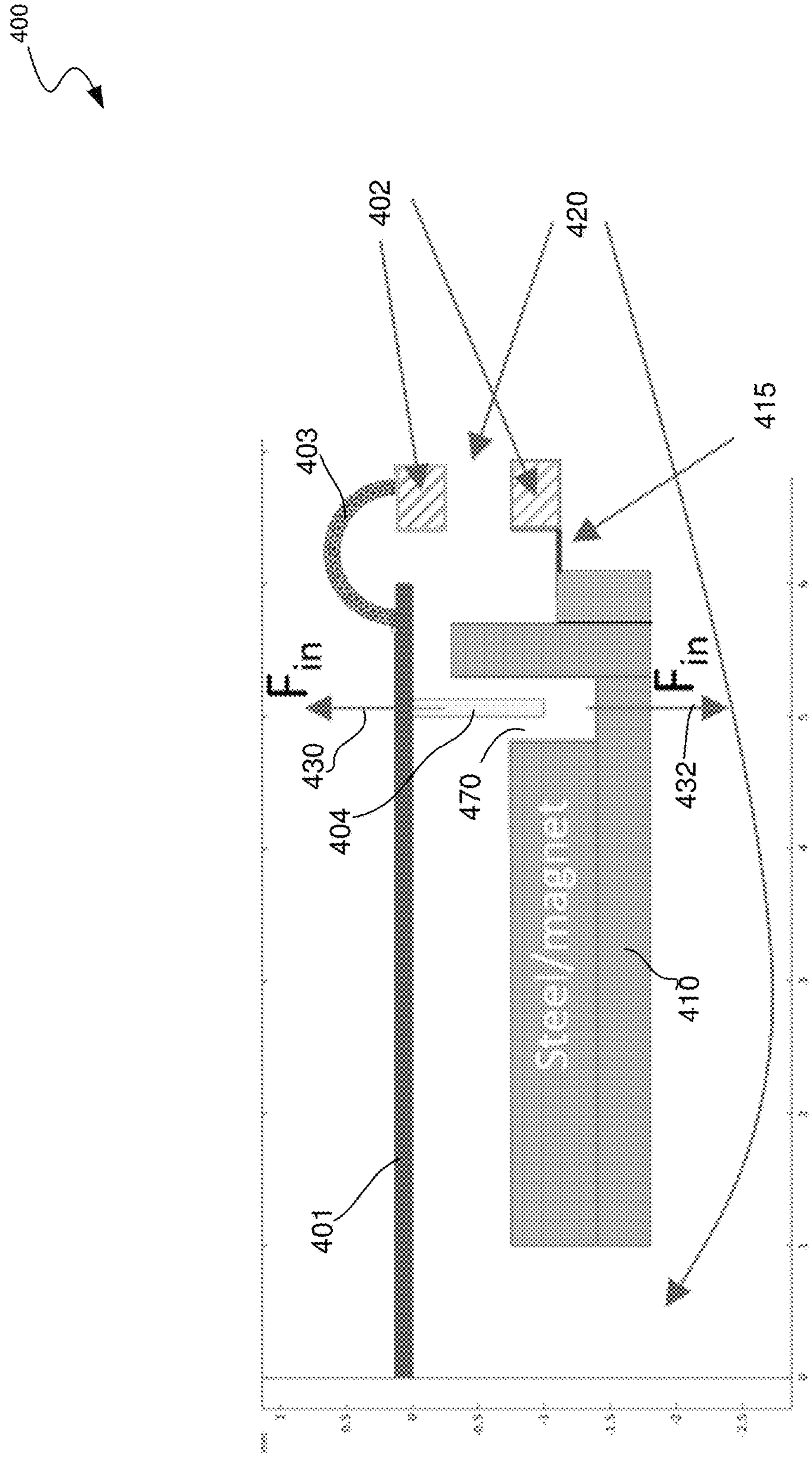
FIG. 4 is a cross-sectional view illustrating a speaker system used for some implementations of the present technology.

FIG. 4 is a cross-sectional view illustrating a speaker system 400 used for some implementations of the present technology. Speaker system 400 includes a single plane decoupling spring 415. System 400 includes a diaphragm 401 (i.e., part of the first moving mass including the voice coil) that is coupled to a fixed basket/frame 402, or housing, of the device/structure that contains the speaker system, such as HMD 200, via a primary suspension 403 or surround 403.

In implementations, diaphragm 401 is a thin, semi-rigid membrane which is configured to generate sound pressure waves when vibrated. Diaphragm 401 includes a front surface and a back surface. In some implementations, surround 403 is a spring shaped as a half roll and is formed from rubber. Surround 403 suspends diaphragm 401 and is configured to flex and allow movement of diaphragm 401.

System 400 further includes a voice coil 404. Voice coil 404 in implementations is metal wire wound tightly around a cylindrical structure and is configured to generate a magnetic field when current (i.e., an audio drive signal) is applied. A base of voice coil 404 is coupled to the back surface of diaphragm 401. In some implementations, voice coil 404 is coupled to the end of diaphragm 401 at a substantially close distance to surround 403.

Voice coil 404 is positioned within the magnetic air gap 470 of motor assembly 410. During speaker operation, current is applied to the voice coil which generates a magnetic field. The magnetic field generated by the voice coil interacts with a magnetic field generated by the steel motor assembly, generating a magnetic force causing the voice coil to move in an up and down motion with an equal and opposite force (creating the desired sound from the diaphragm 401), and causing motor assembly 410 to move in the opposite direction (creating unwanted vibration). The up and down movement of the voice coil causes the diaphragm to vibrate, with the front surface of the diaphragm generating positive sound pressure waves that travel through the air from the front of the speaker system.

System 400 further includes a steel/magnet/motor assembly 410 (i.e., the second moving mass, also referred to as the "driver", "hard part" or "motor yoke"). Motor assembly 410 is coupled to fixed basket/frame 402 via a decoupling spring 415 (i.e., secondary suspension). In the implementation of FIG. 4, spring 415 is a flat spring, but it may be a half roll spring, a spring of another shape, or another suspensions device. In some implementations, motor assembly 410 includes a magnet, a pole piece (not shown), air gap 470, and a top piece (not shown). The magnet is configured to generate a magnetic field and is fitted over the pole piece, and creates an air gap 470 between the magnet and the pole piece. The pole piece is configured to direct the magnetic field generated by the magnet in air gap 470.

System 400 further includes vents 420, which allow air generated by the moving diaphragm 401 and moving motor assembly 410 to escape.

When an audio drive signal (i.e., current to generate a magnetic force) is applied, diaphragm 401 moves in the direction indicated at 430 and motor assembly 410 moves in the direction indicated at 432. While Fin 430 is equal and opposite as Fin 432 on each of motor assembly 410 and diaphragm 401, because of the larger mass of motor assembly 410 relative to diaphragm 401, motor assembly 410 experiences substantially less acceleration than diaphragm 401. In some implementations, motor assembly 410 is approximately 30 times heavier than diaphragm 401, and therefore experiences approximately 30 times less acceleration than diaphragm 401. In some implementations, an acoustic mass is formed in motor assembly 410 to enable the matching of the acoustic load impedances of the two moving masses.

Figure 5:
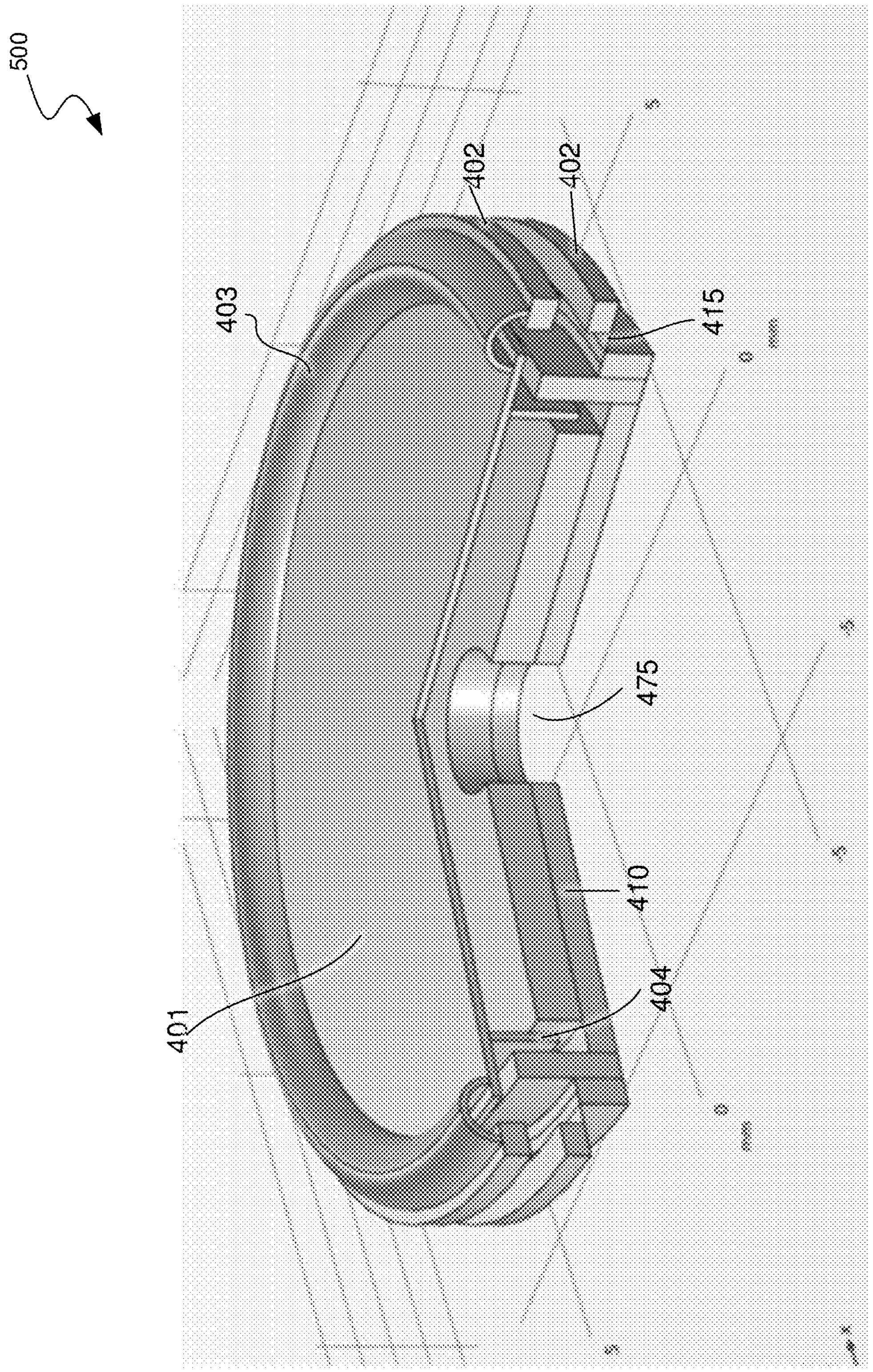
FIG. 5 is a perspective view illustrating a speaker system used for some implementations of the present technology.

FIG. 5 is a perspective view illustrating a speaker system 500 used for some implementations of the present technology. Similar to speaker system 400, speaker system 500 includes diaphragm 401, fixed frame 402, surround 403, voice coil 404, motor assembly 410, and spring 415. While speaker system 500 is circular in shape, in other embodiments, the speaker system may be of any other suitable shape.

FIG. 5 illustrates a motor hole 475 creating an acoustic mass in the center of motor assembly 410. Motor hole 475 provides an acoustic mass that is tuned to be approximately a constant factor N times higher than the acoustic mass associated with the front and back waveguides that load the first moving mass (i.e., diaphragm) when it is moving. The factor N is approximately equal to the ratio of the second moving mass to the first moving mass. This ratio is also approximately equal to the ratio of the second moving mass suspension (i.e., spring 415) stiffness to the first moving mass suspension (i.e., surround 403) stiffness. Motor hole 475 may be covered by a resistive mesh to match with same scale factor N of the resistive part of the acoustic load on the front and back waveguides.

Figure 6:
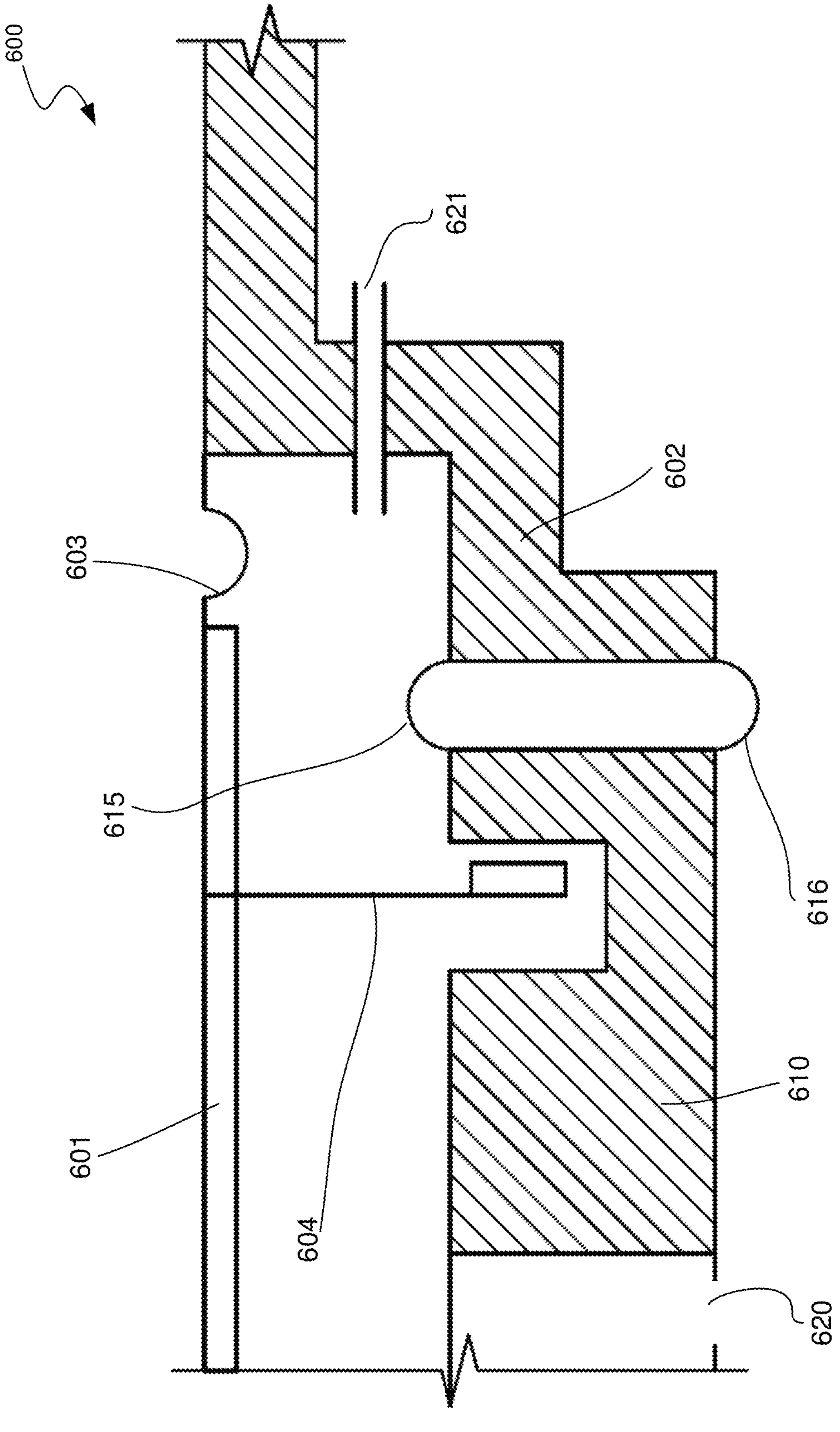
FIG. 6 is a perspective view illustrating a speaker system used for some implementations of the present technology.

FIG. 6 is a perspective view illustrating a speaker system 600 used for some implementations of the present technology. Speaker system 600 includes dual plane decoupling springs 615 and 616. Similar to speaker system 400, speaker system 600 includes diaphragm 601, fixed basket/frame 602, surround 603, voice coil 604, motor assembly 610 with basket, and vents 620, 621.

Speaker system 600 includes dual plane decoupling springs 615, 616. The dual plane suspension increases the speaker system's robustness to drops and rocking. In some implementations, springs 615, 616 do not create a seal between the motor and fixed frame, and are instead segmented such that air may flow between the springs, or the springs can include holes in the structure for ventilation.

As shown in FIGS. 4-6, the secondary suspension (i.e., decoupling spring) can be single or dual plane suspension in implementations, and can be various types of suspensions such as a flat spring or half roll spring. The secondary suspension can be tuned to a frequency approximately the same as the fundamental resonance of the speaker system. The material of the secondary suspension can match the material of the primary suspension providing them similar damping properties. The secondary suspension can be stiffer than the primary suspension, to support the heavier motor assembly.

In some implementations, the secondary suspension may be a spring that is linear during normal operation of the speaker system, and becomes non-linear and stiffening when the displacement of the spring exceeds the normal operating displacement. This non-linearity is designed into the spring, which can be a flat spring or curved spring (e.g., half roll) by allowing for the spring to deform in bending during normal operation (i.e., low/operating displacement) and to deform by extension/tension at large displacements. This can be accomplished by using a short span flat spring, or if the spring is curved, making the free length of the curved spring such that at large displacements the spring goes taut.

Figure 7:
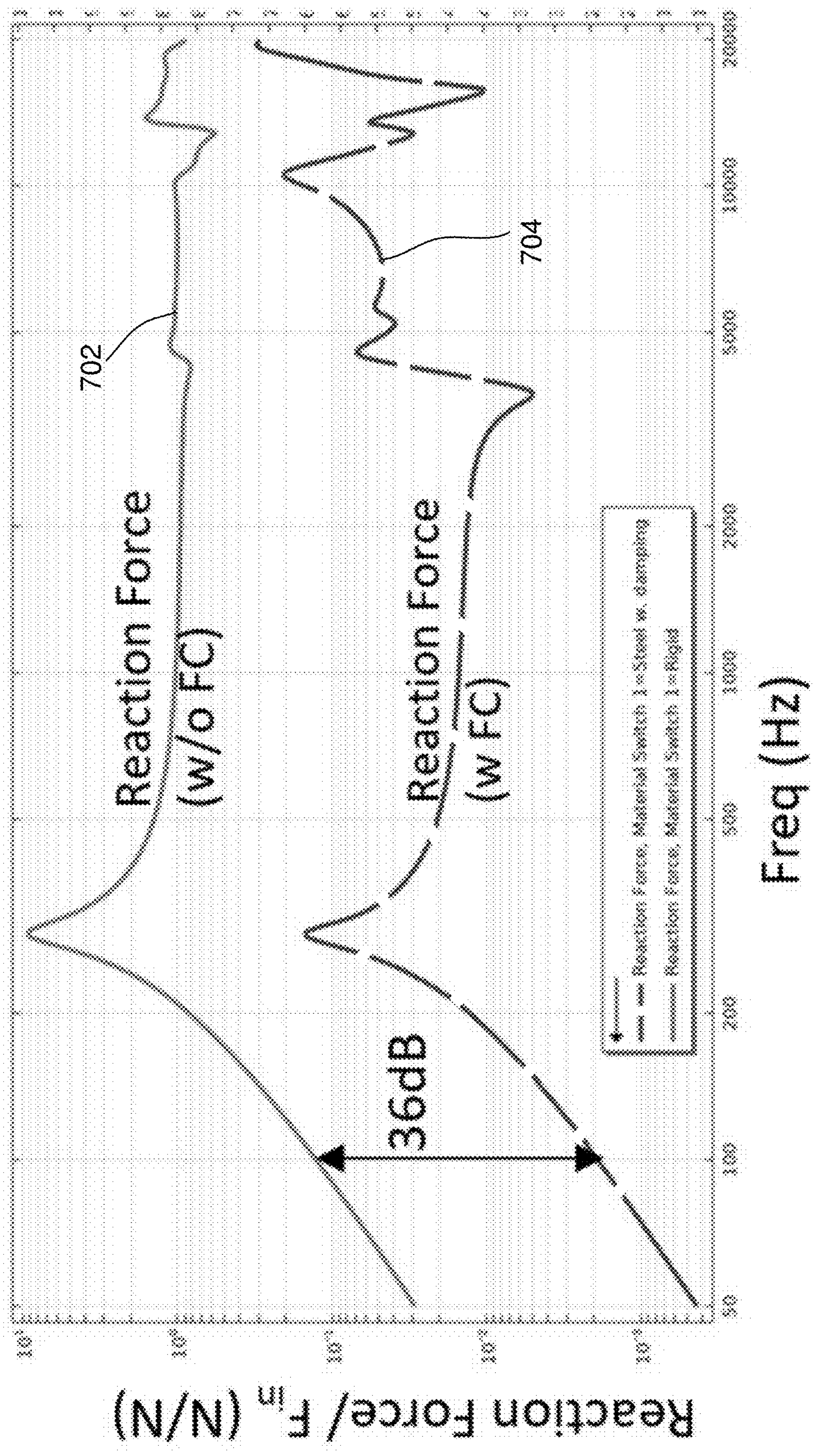
FIG. 7 graphically illustrates the effects of force canceling on the simulated reaction force with known speaker systems and a speaker system used for some implementations of the present technology.

FIG. 7 graphically illustrates the effects of force canceling on the simulated reaction force with known speaker systems and a speaker system used for some implementations of the present technology. The reaction force refers to the net force transferred to the fixed frame while the speaker is in use. Curve 702 represents reaction force without force cancelation (i.e., the secondary suspension is rigid as in known speaker systems), while curve 704 represents the reaction force with force cancelation (i.e., using a decoupling spring as with implementations of the present technology). The example for which force cancelation is enabled (curve 704) experiences an approximate 36 dB attenuation in comparison to curve 702.

Figure 8:
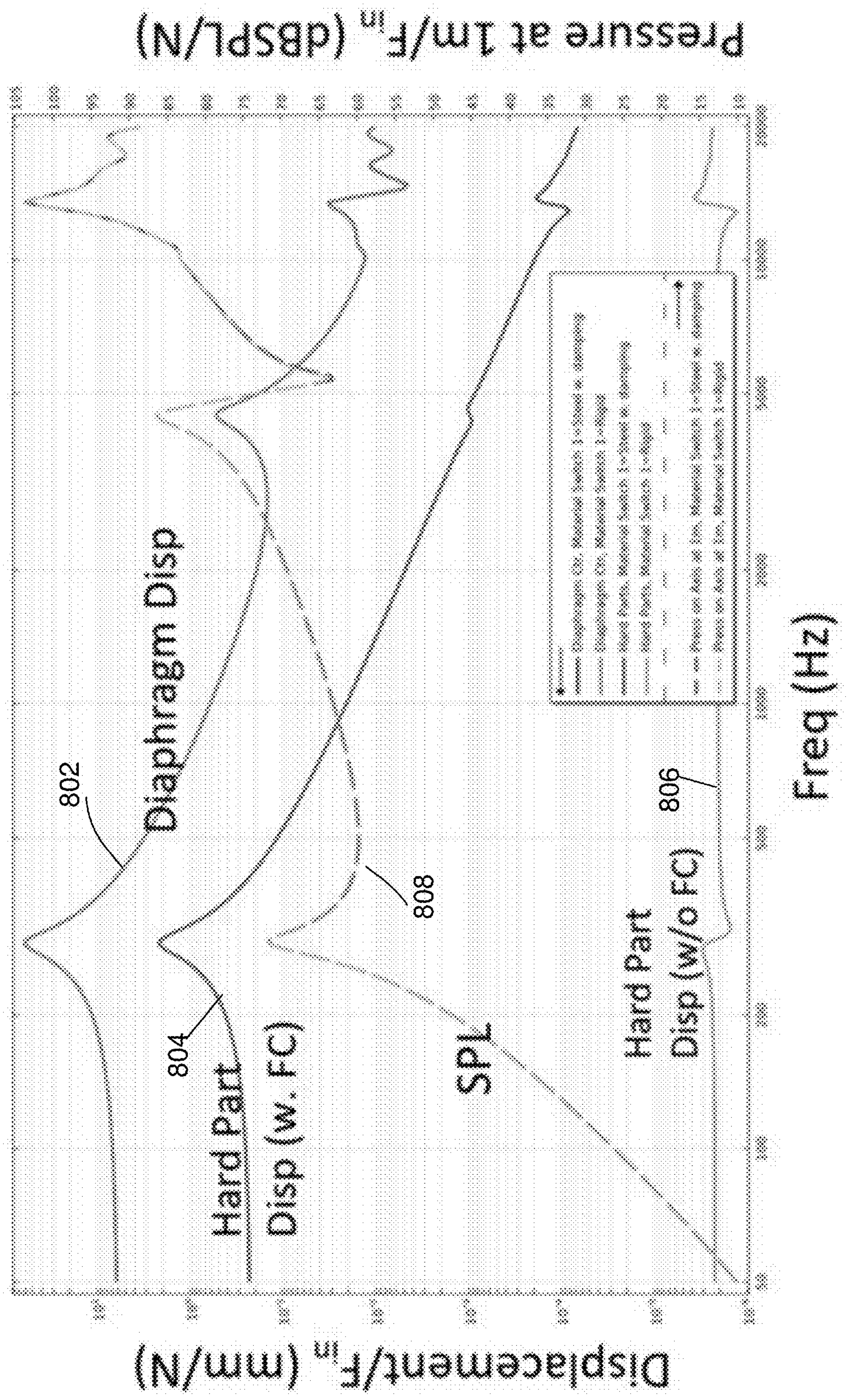
FIG. 8 graphically illustrates the displacement of the diaphragm and the motor assembly for a speaker system with known speaker systems and a speaker system used for some implementations of the present technology.

FIG. 8 graphically illustrates the displacement of the diaphragm and the motor assembly for a speaker system with known speaker systems and a speaker system used for some implementations of the present technology. Curve 802 represents the displacement of diaphragm, while curve 804 represents the displacement of the motor assembly (referred to in FIG. 8 as the "Hard Part") with force cancelation (i.e., with implementations of the present technology) and curve 806 is without force canceling (i.e., known speaker system). The displacement of the motor assembly is approximately 30 times less compared to the diaphragm at curve 804, and therefore the motor assembly requires significantly less energy for it to vibrate than the first moving mass. FIG. 8 further illustrates sound pressure level (SPL) curves with and without force canceling, which are shown as overlapped, indicating that acoustic output is not impacted by force canceling. SPL was measured at a one-meter distance from the speaker system and takes into account radiation from both sides of the speaker system.

Figure 9A:
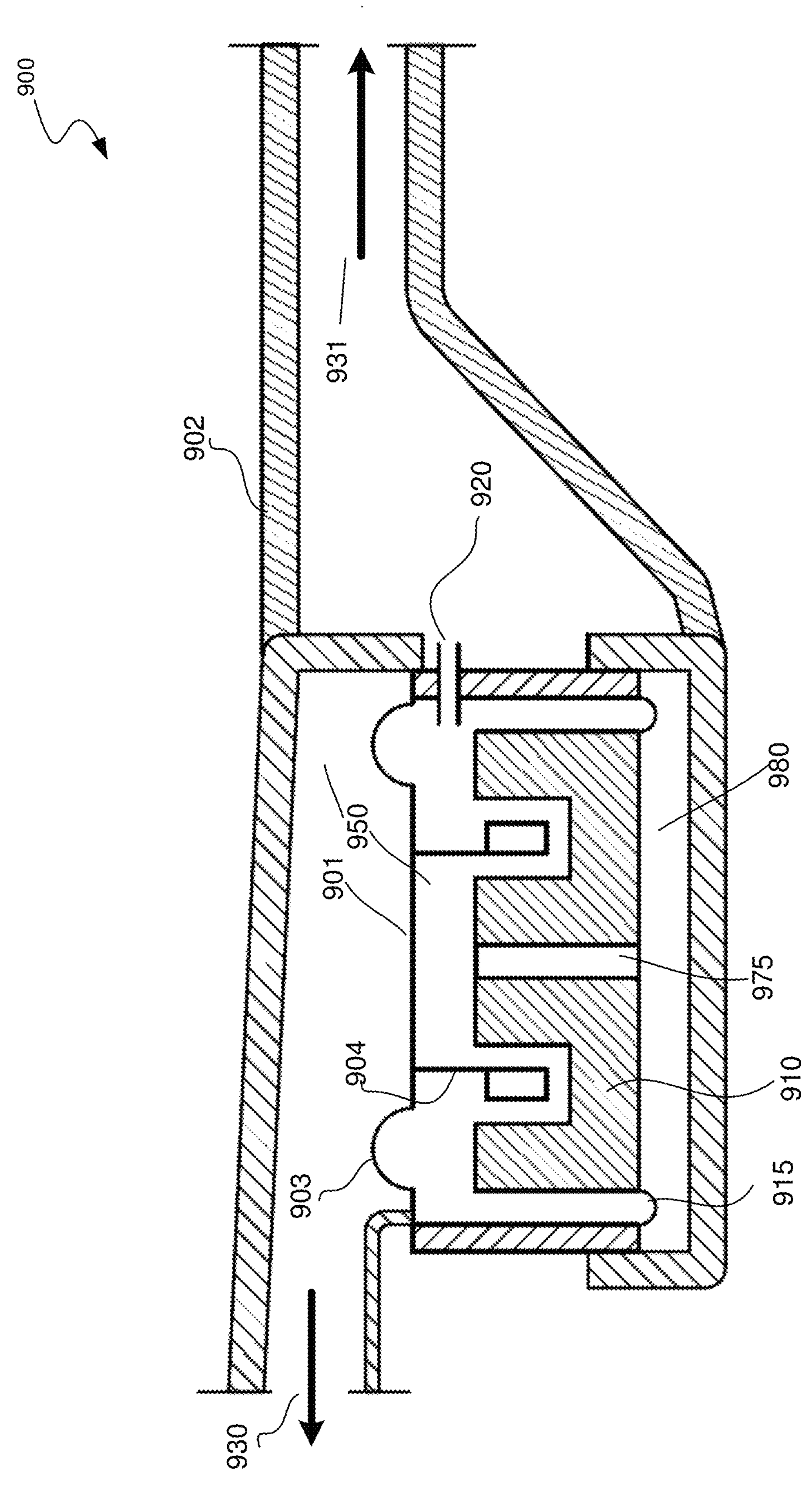
FIGS. 9A-C are cross-sectional views illustrating speaker systems used for some implementations of the present technology.

FIG. 9A is a cross-sectional view illustrating a speaker system 900 used for some implementations of the present technology. Similar to speaker systems 400, 500 and 600, speaker system 900 includes diaphragm 901, fixed frame 902, surround 903, voice coil 904, motor assembly 910 and spring 915. FIG. 9 further illustrates an motor hole or acoustic mass 975, a vent 920, a front port/waveguide 930 and a back port/waveguide 931.

In contrast to FIGS. 4 and 6, FIG. 9A is a cross-section of the entire circular speaker system. Therefore, FIG. 9 illustrates elements such as voice coil 904 twice, on either side of motor hole 975.

Implementations of the speaker system form a dipole configuration, in which sound is radiated from both the front and back to a local area. As the voice coil moves the diaphragm in an up and down motion, the diaphragm generates sound pressure waves that radiate from the front of the speaker through the front waveguide. A back waveguide is formed in part by the back surface of the diaphragm and the top surface of the motor assembly. The waveguides are configured to vent airflow through a front port and a back port.

FIG. 9A illustrates the front and back waveguides, 930, 931 as well as a volume 980 behind the second moving mass 910 that vents to the front of the second mass via acoustic mass 975, which is a small hole in the center of the second moving mass. Both the volume 980 behind the second moving mass and acoustic mass 975 are tuned such that changes to the acoustic volumes 950 in front and behind the diaphragm 901 (caused by movement of diaphragm 901) create opposite forces on motor assembly 910, at least partially cancelling out vibrations of motor assembly 910. Therefore, there is symmetry between the first and second moving mass systems, discussed in detail below in conjunction with FIG. 10 below.

The practical effect of adding the tuned back volume 980 and acoustic mass 975 in the motor assembly is that a 15 dB+ force canceling performance can be maintained over a wide frequency range even when there is significant acoustic loading from the waveguides on the diaphragm.

The sealed volume 980 behind the motor assembly provides an acoustic compliance that is tuned to be a constant factor N times lower than the acoustic compliance associated with the front and back waveguides that load the diaphragm when it is moving. The factor "N" is approximately equal to the ratio of the second moving mass to the first moving mass. This ratio is also approximately equal to the ratio of the second moving mass suspension stiffness to the first moving mass suspension stiffness.

In some implementations, the front port 930 is positioned to provide content towards an ear of the wearer, and the back port 931 is positioned to provide content into a local area of the headset, thereby forming a dipole. Because of the air venting in the design, the volume velocity from the front of the motor assembly is equal and opposite to that off the back of the motor assembly. This allows for cancellation of any radiation due to the suspended hard parts, so that now there is only one effective radiator without peaks and dips in the pressure frequency response due to the interaction between two radiators.

Figure 9B:
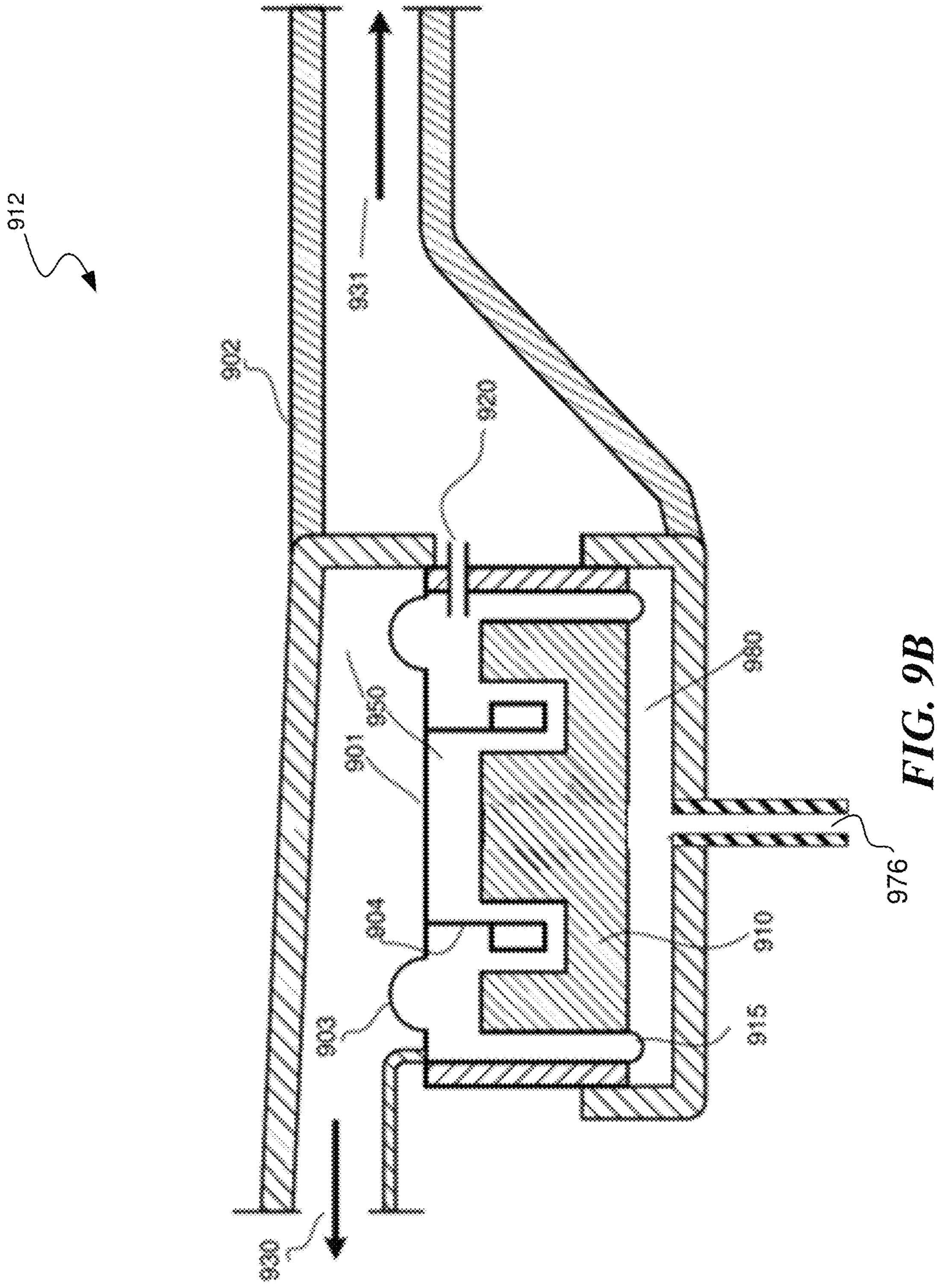

FIG. 9B is a cross-sectional view illustrating a speaker system 912 used for some implementations of the present technology. Speaker system 912 is similar to speaker system 900 of FIG. 9A, except it includes a tube/opening 976 at the bottom of the housing and no hole in the center of the motor assembly.

Figure 9C:
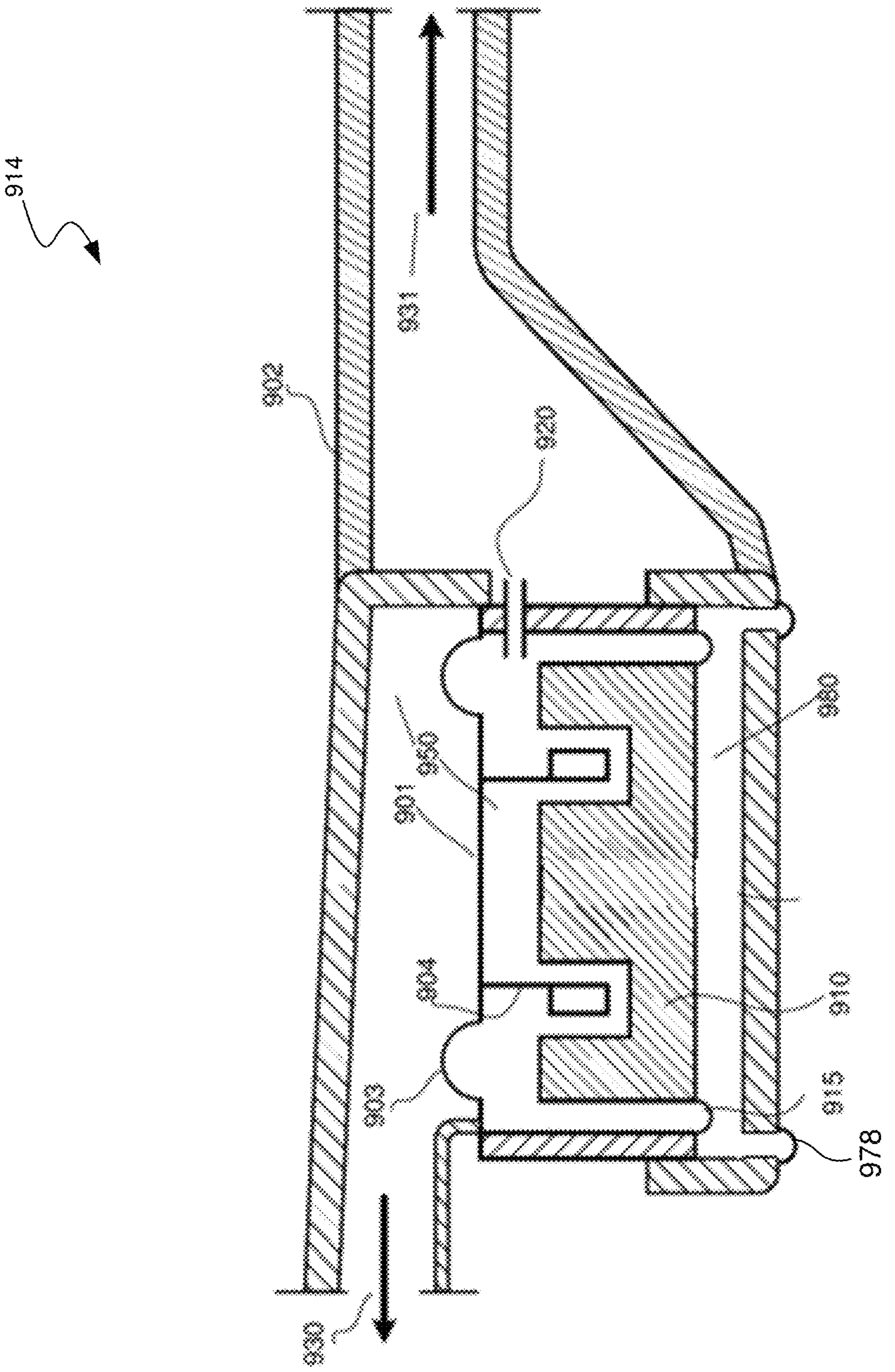

FIG. 9C is a cross-sectional view illustrating a speaker system 914 used for some implementations of the present technology. Speaker system 914 is similar to speaker system 900 of FIG. 9A, except it includes a passive radiator 977 below the motor assembly and no hole in the center of the motor assembly.

Figure 10:
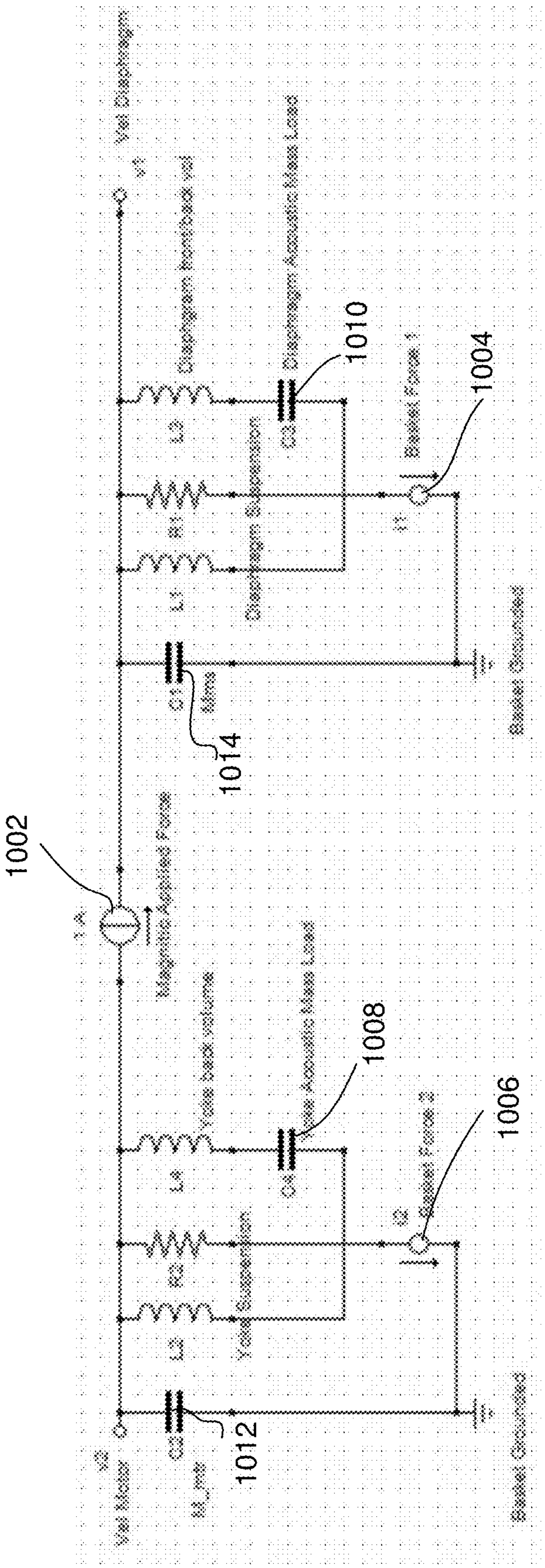
FIG. 10 illustrates an electrical circuit analogy for the dynamic behavior using lumped parameters of the mechanical/acoustical system of implementations of the present technology. In this analogy, the across variable is linear velocity, instead of voltage, and the through variable is force, instead of current.

FIG. 10 illustrates an electrical circuit analogy for the dynamic behavior using lumped parameters of the mechanical/acoustical system of implementations of the present technology. In this analogy, the across variable is linear velocity, instead of voltage, and the through variable is force, instead of current. Current source 1002, labeled "Magnetic Applied Force", represents the magnetic force pushing in an equal and opposite direction on the voice coil (and attached "soft parts") and motor yoke (and attached "hard parts"). All the elements on the right of 1002 are the components that include the speaker soft part dynamics, including the voice coil, diaphragm/cone, surround, and the acoustic load on the diaphragm which generates a pressure on the enclosure above the diaphragm. They capture, for example, the spring force from the surround that is acting on the housing that needs to be canceled, the force to move the soft parts mass, as well as the acoustic pressure forces above the diaphragm that are acting on the housing that need to be canceled. The net force acting on the housing/basket/enclosure from the soft parts is represented by current sensor 1004, labeled "Basket Force 1."

All the elements to the left of 1002 govern the forces and velocity of the moving motor assembly, such as the motor spring/suspension force, which is there to cancel the surround spring force, as well as the force that is transmitted to the housing from the pressure generated by the moving motor, which is there to cancel the pressure force generated above the diaphragm. The net force acting on the housing/basket from the hard parts is represented by the current sensor 1006, labeled "Basket Force 2."

For simplicity, the acoustic loads are represented by capacitors 1008, 1010 (acoustic masses) but in reality would also be some damping (resistive) and compliant (inductance) elements in the acoustic load representation to make it more accurate, especially at higher frequencies.

In order for there to be perfect force canceling on the housing/basket/enclosure, current sensor 1004 must be equal to current sensor 1006. This can be achieved by a design with the correct lumped parameter values, such that the acoustic load impedance of every element on the left side is scaled (by the same factor) to the impedance of its corresponding element on the right side. So if the moving motor assembly mass C2 at 1012 is 30 times that of the moving soft part mass C1 (Mms) at 1014, then all other mechanical impedances of elements on the left side must also be 30 times greater than their corresponding elements on the right.

In implementations, the force cancelling performance of the speaker system may be improved to account for manufacturing imperfections, by modifying attributes of components of the speaker system. In some implementations, an additional mass may be added to the motor assembly (e.g., to the yoke/hard parts) to adjust the tuning frequency of the second mass to approximately that of the first mass. In other implementations, the active length of the secondary suspension (e.g., flat spring) is adjusted to change the compliance of the second mass's suspension.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A speaker system comprising:

a fixed frame; a voice coil;

a first moving mass comprising a diaphragm, the first moving mass coupled to the fixed frame via a non-rigid primary suspension and coupled to the voice coil; and a second moving mass, comprising a motor assembly, coupled to the fixed frame via a non-rigid secondary suspension comprising a decoupling spring, wherein the motor assembly is configured to move the voice coil in response to an audio drive signal applied through the motor assembly.

2. The speaker system of claim 1, wherein the primary suspension comprises a surround coupled to the diaphragm.

3. The speaker system of claim 1, wherein the decoupling spring comprises holes in a structure of the decoupling spring.

4. The speaker system of claim 3, wherein the decoupling spring comprises a flat spring.

5. The speaker system of claim 3, wherein the decoupling spring comprises a half roll spring.

6. The speaker system of claim 3, wherein the non-rigid secondary suspension comprises a first decoupling spring on a top side of the motor assembly and a second decoupling spring on a bottom side of the motor assembly.

7. The speaker system of claim 1, further comprising a front waveguide and a rear waveguide.

8. The speaker system of claim 1, wherein the first moving mass has a first acoustic load impedance and the second moving mass has a second acoustic load impedance; and wherein the first impedance and the second impedance are approximately matched using a scaling factor.

9. The speaker system of claim 1, wherein the first moving mass and primary suspension have a first natural frequency and the second moving mass and secondary suspension have a second natural frequency; and wherein the first natural frequency and the second natural frequency are substantially the same.

10. The speaker system of claim 1, wherein the fixed frame comprises a housing of a wearable device.

11. The speaker system of claim 10, further comprising:

a first acoustic volume formed between a top of the diaphragm and the housing and a second acoustic volume formed below the motor assembly;

wherein first magnetic forces on the voice coil cause movement of the diaphragm, causing first acoustic forces above the diaphragm on the housing and corresponding magnetic forces on the motor assembly, causing second acoustic forces below the motor and on the housing, wherein the second acoustic forces are opposite the first acoustic forces which at least partially cancels the first acoustic forces.

12. The speaker system of claim 10, wherein the motor assembly comprises an opening on the housing below the motor assembly.

13. The speaker system of claim 1, wherein the first moving mass and primary suspension have a first resonance quality and the second moving mass and secondary suspension have a second resonance quality; and wherein the first resonance quality and the second resonance quality are substantially the same.

14. The speaker system of claim 1, wherein the motor assembly comprises a motor hole at a center of the motor assembly.

15. The speaker system of claim 1, wherein the motor assembly comprises a passive radiator below the motor assembly.

16. A method of operating a wearable device comprising a fixed frame and a speaker system, the method comprising:

applying an audio drive signal to the speaker system, wherein the speaker system comprises A) a voice coil, B) a first moving mass comprising a diaphragm, the first moving mass coupled to the fixed frame via a non-rigid primary suspension and coupled to the voice coil, and C) a second moving mass comprising a motor assembly coupled to the fixed frame via a non-rigid secondary suspension comprising a decoupling spring, wherein the audio drive signal causes the voice coil to move, causing the diaphragm to move, and wherein a first force, on the second moving mass caused by applying the audio drive signal, is canceled by a second force on the moving motor assembly from the non-rigid secondary suspension.

17. The method of claim 16, wherein the primary suspension comprises a surround coupled to the diaphragm.

18. The method of claim 16, wherein the decoupling spring comprises holes in a structure of the decoupling spring.

19. The method of claim 18, wherein the decoupling spring comprises a flat spring.

20. The method of claim 18, wherein the decoupling spring comprises a half roll spring.

* * * * *